Patented Jan. 8, 1946

2,392,691

UNITED STATES PATENT OFFICE 2,392,691

RUBBER-PHENOL ALDEHYDE CONDENSATION PRODUCTS

Frederick James William Popham, New Barnet, England, assignor to The British Rubber Producers' Research Association, London, England No Drawing. Application June 19, 1943, Serial No. 491,560. In Great Britain August 14, 1942

2 Claims. (Cl. 260—768)

This invention relates to rubber-phenol aldehyde condensation products.

In the British Patent Specification No. 417,912 there is described a process for the preparation of oxidised derivatives of rubber consisting in oxidising the rubber dissolved in a solvent such as benzene, carbon tetrachloride, chloroform or white spirit in the presence of a metallic oxidising catalyst and separating the oxidised derivative either by precipitation or evaporating the solvent. Moreover in the specification of copending application Serial No. 466,673 a process for the preparation of synthetic resinous condensation products is described consisting in intimately mixing oxidised rubber prepared, for instance according to the aforementioned patent specification, with maleic anhydride and a phenol, heating the mixture in the presence of air or oxygen and then reacting it with formaldehyde.

It has now been found that by employing phenol or cresol as solvent for the rubber during the oxidation treatment, isolation of the intermediate oxidised rubber derivative is unnecessary for the preparation of the synthetic condensation product with formaldehyde, and the manufacture of such products and moulding compositions, adhesive and the like products therefrom is thus simplified and rendered more economical.

Broadly stated, the present invention consists in dispersing rubber, which may be or may include a proportion of, reclaim, in a phenol or cresol with a small proportion of a metallic oxidising catalyst such as a metallic soap soluble or capable of being dispersed therein, and in oxidising the rubber by passing a gas such as oxygen, air or ozonised air through the mixture until a soluble solution in acetone is obtained. This solution containing the oxidised rubber may then be reacted with a condensing agent such as formaldehyde under appropriate conditions, e. g. while preventing undue rise in temperature, to produce synthetic resinous condensation products having the improved characteristics referred to in the specifications of application No. 466,673 and copending application Serial No. 469,571.

The rubber and/or reclaim can be added to the phenol without previous milling, solution being effected in about six hours and aqueous phenol being employed if desired. It is preferable to use softened rubber and a quicker solution is obtained if the rubber and catalyst are milled or mixed with a portion of the phenol before oxidation. In this case the solution is effected in about two hours. The solution is heated to 140°–150° C. in a current of air or oxygen in the presence of a metallic oxidising catalyst such as cobalt naphthenate and oxidation proceeds.

In order to effect solution in the time stated the current of air or oxygen is passed through the suspension of rubber in phenol from the commencement of the treatment.

Phenol or cresol volatilised in the oxygen stream can be trapped in water and recovered for further use.

Where reclaim is being used, the filling material therein—including free carbon—is precipitated during the formation of the resin. Where "rubber" is referred to in the appended claims it is to be understood that the term is employed in its descriptive sense and includes natural rubber with or without small amounts of reclaimed rubber. If desired the resin may be extracted with alcohol and used directly, either as an adhesive or for the impregnation of fabric or paper for the manufacture of laminated sheets, although when the resin is to be used as a moulding powder the fillers—including carbon—are more conveniently left in the resin.

The intermediate resin produced from reclaim is softer than that obtained from softened rubber but responds to the action of hardening agents such as hexamethylene tetramine.

The following examples will illustrate the practice of the invention:

Example I 200 gms. of softened rubber are mixed with 1000 gms. phenol and 1.5 gms. of cobalt naphthenate (10% Co) are added, the solution being blown at 140°–150° C. in a current of oxygen for about 7 hours when the mixture is soluble in an excess of acetone. The oxidised rubber can be separated by neutralising with caustic soda and extracting with benzol, or the mixture after cooling to about 100° C. may be converted into a resin by adding 800 ccs. of 40% formaldehyde and 10 gms. of oxalic acid and boiling in a vessel equipped with a stirrer. After about 45 minutes at circa 100° C. the resin drops from the aqueous phase, and the water may then be distilled off under vacuum when the temperature may be raised to 105°–120° C. to leave a dark brown thermo-setting resin soluble in alcohol and caustic soda.

The resin may be used directly as a bonding agent, or ground into a powder form with fillers and a hardening agent as moulding composition,

Example II 260 gms. of reclaim (whole tyre 60% rubber) are mixed with 1000 gms. phenol and 3.5 gms. cobalt naphthenate as catalyst and the mixture is heated to 140-150° C. and a current of oxygen passed through for about 5½ hours, that is, until it is soluble in an excess of acetone.

800 cc. of 40% formaldehyde and 10 gms. of oxalic acid are then added to the solution which is then heated to about 100° C. while being stirred. The fillers precipitate out and can be separated and after about 45 minutes the resin drops giving a yield of 1196 gms. of light amber resin similar to those produced by the processes described in the specifications of application No. 466,673 and co-pending application No. 469,571 and having similar mechanical properties as regards tensile strength, solubility and residual thermo-plasticity after thermo-setting.

What I claim is:

1. A process for the preparation of rubber-phenol aldehyde condensation products consisting in dispersing rubber in phenol with between 1.5% and 3.5% of a metallic oxidizing catalyst such as cobalt naphthenate capable of being dispersed therein, oxidizing the rubber in the dispersion by passing an oxidizing gas therethrough while the dispersion is heated to between 140° and 150° C. until the rubber is dissolved, adding formaldehyde and an acid condensation catalyst, and boiling the mixture until there is produced a resin by the condensation of the formaldehyde with the phenol and oxidized rubber.

2. A process for the preparation of rubber-phenol aldehyde condensation products in accordance with claim 1 wherein the oxidized rubber dispersed in the phenol is reacted with formaldehyde to which is added an acid condensation catalyst such as cobalt naphthenate, while maintaining the temperature at about 100° C., and finally separating the resin by distillation.

FREDERICK JAMES WILLIAM POPHAM.